Patented Nov. 1, 1927.

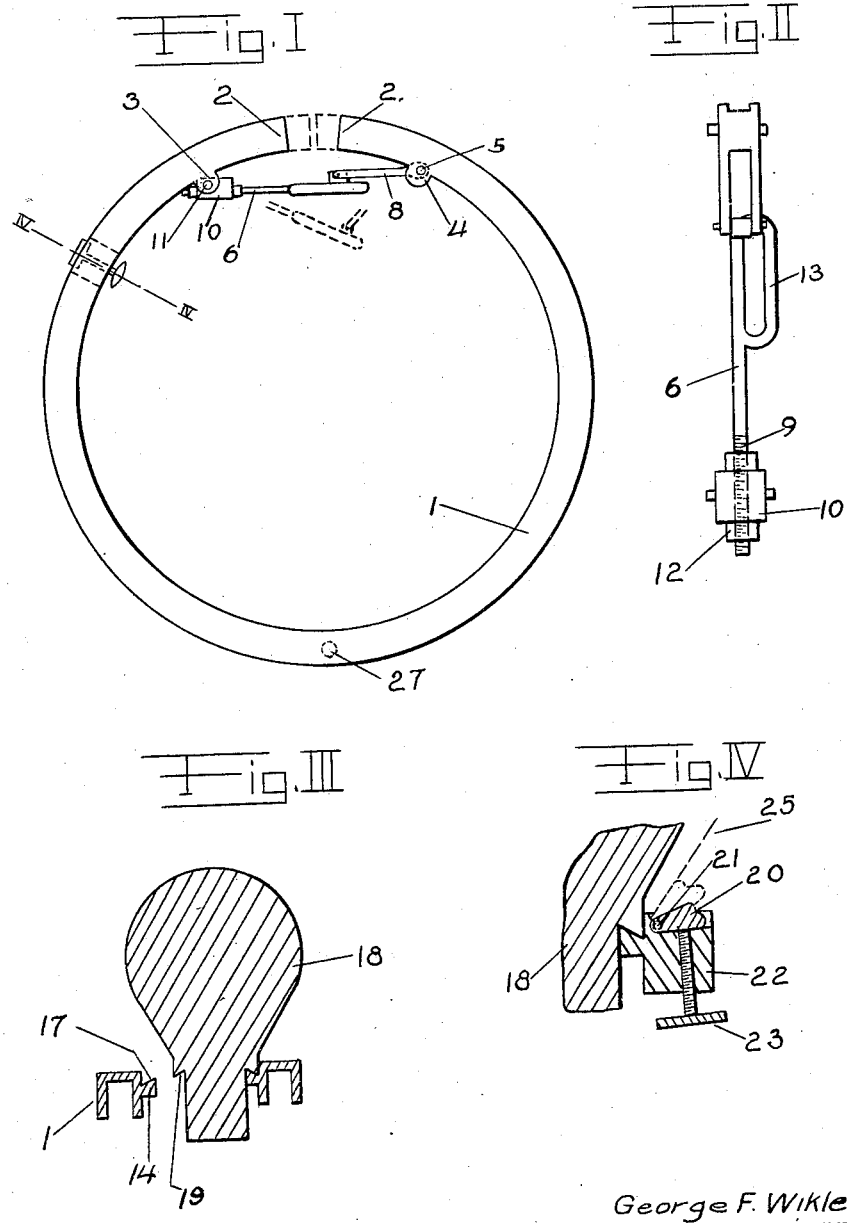

1,647,164

UNITED STATES PATENT OFFICE.

GEORGE F. WIKLE, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

BUILDING-CORE BEAD RING.

Application filed November 30, 1925. Serial No. 72,244.

My invention relates to the manufacture of pneumatic tire casings and more particularly to bead positioning rings used with certain types of building cores.

It is among the objects of my invention to provide a bead positioning ring which shall be light and easily handled and which may be quickly and positively locked in registered position, to the core.

Other and further objects will appear from the specification and claims.

In the accompanying drawings, which illustrate one embodiment of my invention,

Figure 1 is a side view of my bead positioning ring,

Figure 2 is a detail plan view of the operating toggle,

Figure 3 is a diagrammatic section showing the manner of locking the ring to a core and Figure 4 is a section on line 4—4 of Figure 1.

Referring to Figure 1 the body of the ring is indicated at 1. The ring is formed of cast steel or a similar material and is preferably of a U shape in cross section. The ring is split as shown in Figure 1 and when unrestrained the ends 2 assume the position shown in dotted lines in Figure 1. On the inner periphery of the ring adjacent its ends are formed lugs 3 and 4 in which are respectively pivoted arms 6 and 8 of a toggle. Arm 8 is directly pivoted to lugs 4 at 5 while arm 6 is threaded at its end as indicated at 9 and is adapted to be held in adjusted position with respect to a sleeve 10, pivoted to lugs 3 at 11, by means of nuts 12. Arm 6 is formed with a loop 13 constituting a convenient handle by which the ring may be handled and the toggle set and broken. When the toggle is broken as shown in dotted lines in Figure 1 the ring is free of restraint and the ends 2 are relatively close together as shown in the latter figure. When the toggle is straightened as shown in full lines in Figure 1 the ends are separated and the effective diameter of the ring is increased to the bead diameter of the casing to be built. As shown in Figure 3 one face of the ring 1 is provided with a projecting rib 14, the upper face 17 of which is inclined radially to form a dove-tail. The core 18 is provided with an annular recess 19 so formed that when ring 1 is in unrestrained condition, as indicated at the left of Figure 3, the rib 14 will freely pass below the outer edge of recess 19 whereupon by setting the toggle the ring is expanded moving rib 14 outwardly into locking engagement with recess 19, as shown at the right of Figure 3, and bringing the ring into the desired register with the core as well as maintaining the expanded ring in true circular form. In certain building methods the end of a strip of carcass material is clamped to the core at the beginning of the building operation and for this purpose I provide a clamp comprising a block 20 pivoted at 21 in a solid web 22 formed in ring 1. A thumb screw 23 is threaded in web 22 to engage the under face of block 20 and force the block outwardly to clamp a ply or plies of carcass material 25 against the core as indicated in dotted lines in Figure 4. Any other suitable clamping means may be employed.

When it is desired that the clamp or toggle shall always be positioned at the same point with relation to the perimeter of the core a dowel pin 27 engaging a suitable slot in the core may be provided on the ring or a visual indication may be placed on the ring and core.

It will be understood that the relative amount of expansion of ring 1 has been exaggerated in the drawings for the sake of clearness and that the specific details shown are illustrative only.

I claim:

1. A bead positioning ring for use with a tire building core comprising an expansible ring normally of less than bead diameter, and means to simultaneously expand the ring to bead diameter and position the ring in registered relation with the core.

2. A bead positioning ring for use with a tire building core comprising an expansible ring normally of less diameter than bead diameter a registering and locking formation on the ring adapted to co-operate with a registering and locking formation on the core and means to expand the ring to bring the latter to bead diameter and into locked registered relation with the core.

3. A bead positioning ring for use with a tire building core comprising an expansible ring normally of less diameter than bead diameter a registering and locking rib on the ring adapted to co-operate with a registering and locking groove on the core and means to expand the ring to bring the latter to bead diameter and into locked registered relation with the core.

4. A bead positioning ring for use with a tire building core comprising a split expansible ring normally of less diameter than bead diameter a dove-tailed registering and locking rib on the ring adapted to co-operate with a dove-tail groove in the core and means to expand the ring to bring the latter to bead diameter and into locked registered relation with the core.

5. A bead positioning ring for use with a tire building core comprising a split expansible ring normally of less diameter than bead diameter, a dove-tailed registering and locking rib on the ring adapted to co-operate with a dove-tail groove on the core and a toggle bridging the split portion of the ring adapted to expand the ring to bring the latter to bead diameter and into locked registered relation with the core.

6. A bead positioning ring for use with a tire building core comprising an expansible ring normally of less diameter than bead diameter, means to simultaneously expand the ring to bead diameter and position the ring in registered relation with the core, the ring being provided with means to clamp the bead portion of a ply of carcass material to the core.

In testimony whereof I have signed my name to the above specification.

GEORGE F. WIKLE.